United States Patent Office 3,537,744
Patented Nov. 3, 1970

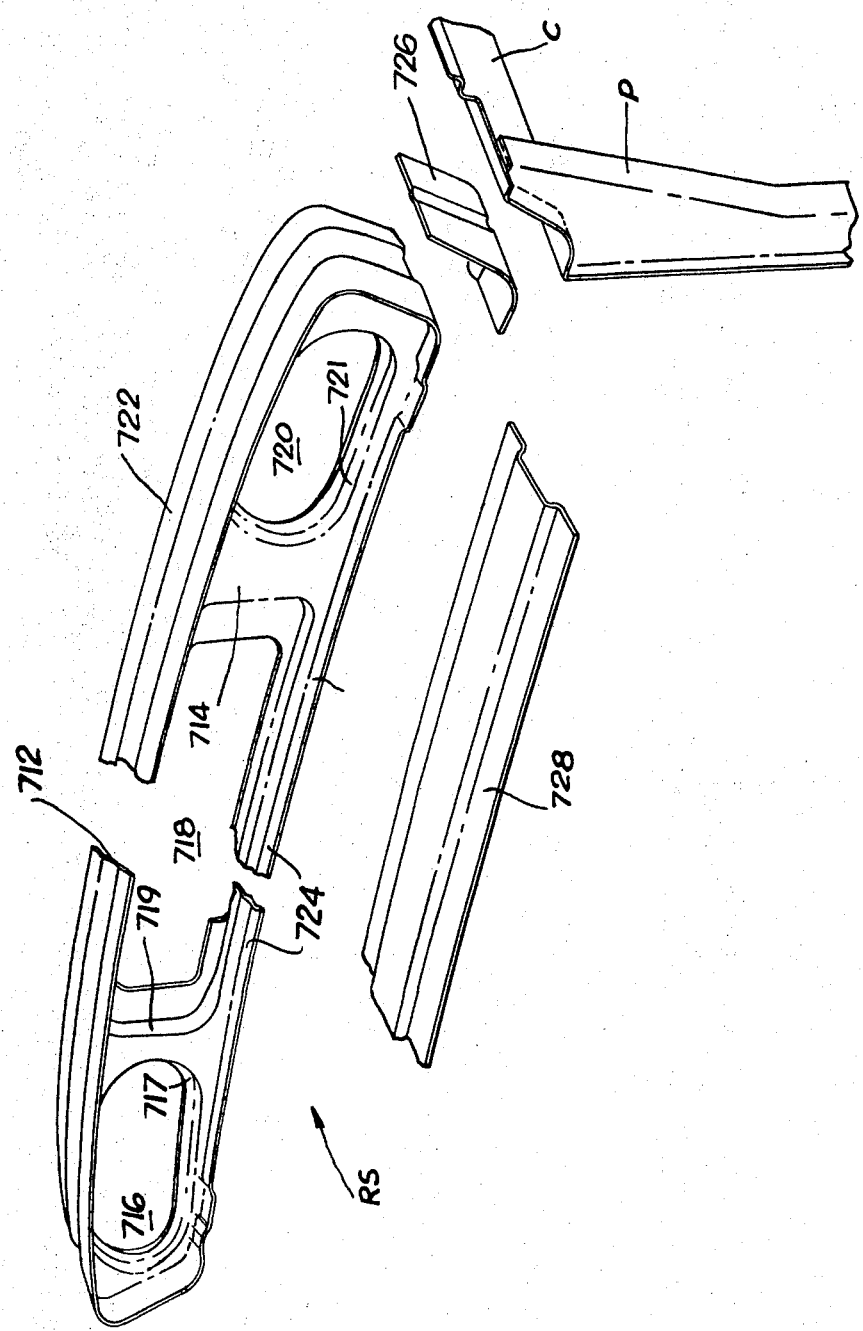

3,537,744
VEHICLE BODY CONSTRUCTION
John Dunbavan, Preston, England, assignor to Leyland Motors Limited, Leyland, Lancashire, England
Filed Feb. 28, 1968, Ser. No. 708,818
Claims priority, application Great Britain, Mar. 1, 1967, 9,751/67
Int. Cl. B62d 25/06
U.S. Cl. 296—28    4 Claims

ABSTRACT OF THE DISCLOSURE

A vehicle body having a roof stick in the form of an assembly consisting of two main components secured back-to-back with abutting flanges with a number of openings therein and an out-turned flange around the outer circumference of the opening.

---

The invention relates to several details of the construction of vehicle bodies and is particularly applicable to the body of large passenger vehicles, typically coaches and buses.

The design and construction of the parts of coaches and buses is largely dictated by the traditions of the craft of coach building, stemming from the day of the horse drawn vehicle. A great obstacle to the large scale production of passenger vehicles based upon a standard design, comparable to present day motor car practice, is the heavy demand which these traditional techniques make upon the time of skilled craftsmen.

The invention relates to the design of a coach or bus body requiring a much smaller contribution by skilled craftsmen than traditional types.

To that end the invention is concerned with one important aspect of the construction of vehicle bodies. Although the aspects of the invention are described below in an order which is convenient it should not thereby be inferred that this corresponds to the order of importance and significance of the several aspects of the invention.

The lower external panels, which coach builders call the lower valance, are normally of rigidly constructed metal and rigidly secured to the main body structure of the vehicle either by hinging and clips or by some permanent fixture such as riveting. Such construction and fixture do not allow the deflection upon impact and quite minor blows can involve expensive repairs. The cost of first assembly is also relatively high on account of the high content of skilled labor involved.

The roof support commonly used at the present time in the construction of vehicle bodies is a fabricated metal or wooden member usually of a shallow section giving no resistance to transverse buckling of the body and requiring to be secured to the tops of pillars by means of separate brackets.

In accordance with the present invention a roof support for a vehicle body is an assembly of substantial depth which can form a high strength transverse structural member at the top of the pillars. It consists of two main components typically sheet metal pressed members, secured back to back along the line of abutment of flanges substantially normal to the plane of the assembly, around the circumference of an opening or of each of a number of openings in the member. Each member having an out-turned flange of substantial depth around its outer circumference.

Preferably the members are spaced at each end face and along the bottom face to receive closing panels.

The bottom edge flanges can be used to support non-structural sheet material such as roof lining panels while the upper flanges form transverse supports for the vehicle roof.

In order that the invention may be more thoroughly understood the outrigger bracket assembly, the lower valance and its fastenings, a pillar, a truss plate, a roof support and a seating in accordance with its several aspects will be described in some detail by way of example, with reference to the accompanying drawings, in which:

The figure is a perspective view of the roof support.

The drawing shows a roof support RS which is an assembly of two identical metal pressings 712 and 714, these main components being secured together by spot welding along the lines of abutment of flanges 717, 719, and 721, around openings 716, 718 and 720 respectively. Each member has an out-turned flange (722, 724 respectively) of substantial depth around its outer periphery.

The members 712 and 714 are spaced around the outer periphery to receive end closing panels one of which is shown at 726, and a closing panel 728 along the bottom face of the roof support, secured by spot welding.

Each end of the roof truss RS rests on the cantrail C to be supported on the pillar P of the vehicle without any need for the usual brackets. By reason of its construction and depth the roof truss RS can serve as a high strength transverse structural member.

The openings at 716, 718 and 720 permit the space between the vehicle roof and its lining to be used as a duct for ventilating air and service facilities, thus to derive an additional benefit from the substantial depth of the roof truss.

I claim:
1. A vehicle body having a roof support in the form of an assembly of substantial depth serving as a transverse structural member and consisting of two main components, each component having identical openings therein defined by flanges around the circumference of said openings and extending substantially normal to the plane of the component, said components being oriented so that corresponding openings are aligned and said flanges extend inwardly so that they abut each other, the components being secured along the line of abutment of said flanges, and each component having an out-turned flange of substantial width around its outer circumference.

2. A vehicle body according to claim 1, in which the said members of the roof support assembly are spaced at each end face and along the bottom face to receive closing panels.

3. A vehicle body according to claim 1, in which the said two members of the roof support assembly are identical metal pressings and are secured by spot-welding.

4. A vehicle body according to claim 1, in which each end of the roof support rests on a cantrail to be supported directly on a pillar of the vehicle.

References Cited

UNITED STATES PATENTS

| | | | |
|---|---|---|---|
| 2,092,472 | 9/1937 | Rafter | 52—634 |
| 2,199,101 | 4/1940 | Hicks | 296—137 |
| 2,508,032 | 5/1950 | Kennedy | 52—729 |
| 2,697,990 | 12/1954 | Parsons et al. | 105—399 XR |
| 3,066,621 | 12/1962 | Dean et al. | 105—409 XR |
| 3,099,335 | 7/1963 | Sklar | 52—729 XR |

FOREIGN PATENTS

| | | |
|---|---|---|
| 602,110 | 5/1948 | Great Britain. |
| 676,497 | 7/1952 | Great Britain. |

BENJAMIN HERSH, Primary Examiner

L. J. PAPERNER, Assistant Examiner

U.S. Cl. X.R.

52—730; 105—409; 296—137